United States Patent Office 2,909,635
Patented Oct. 20, 1959

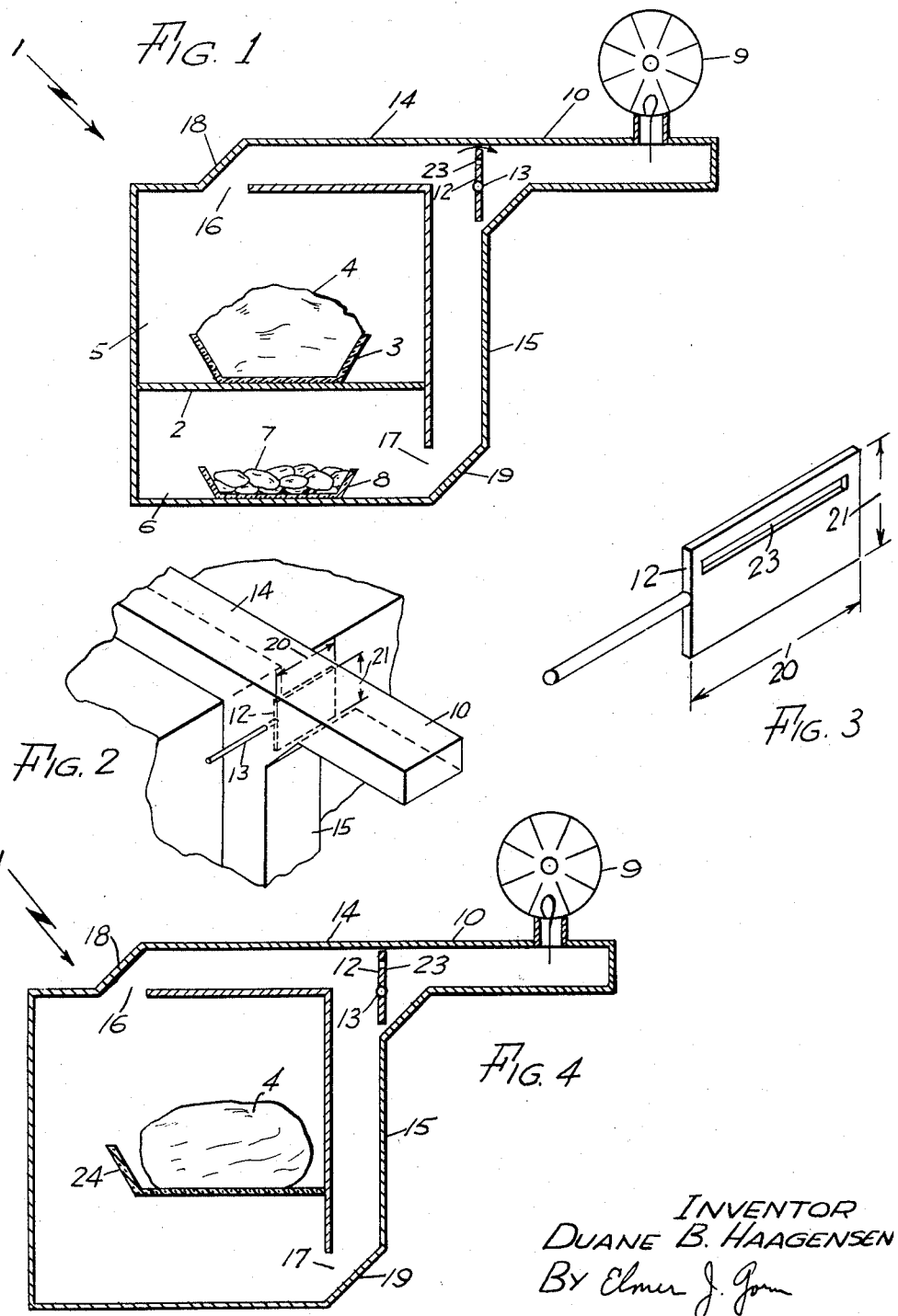

2,909,635

ELECTRONIC OVEN SYSTEMS

Duane B. Haagensen, Wayland, Mass., assignor to Raytheon Company, a corporation of Massachusetts Application July 29, 1957, Serial No. 674,959

11 Claims. (Cl. 219—10.55)

This invention relates in general to microwave electronic ovens and more particularly to devices used to feed energy to such ovens for heating purposes.

In cooking with microwave energy, the heating of a food mass is accomplished by the penetration of microwave energy into the food mass and the consequent agitation of molecules within the food mass. This high-frequency molecular agitation results in frictional heat that cooks the food mass in a very short time. The microwave energy that penetrates the food is the result of energy waves that are directly incident on the surface of the food mass and energy waves that are reflected from some other surface before striking the food mass. The wavelength of this microwave energy may be small in comparison to the linear dimensions of the foodstuff to be cooked. When the incoming energy enters the oven cavity it sets up a particular energy pattern throughout the cavity. The number of modes of oscillation that can possibly exist within an oven cavity is dependent upon the frequency of oscillation of the energy source and the linear dimensions of the cavity. The number of modes of oscillation that actually exist in a particular cavity is additionally dependent upon the point at which the energy is fed into the cavity. For uniform heating of the food mass, it is, therefore, desirable to vary the mode pattern within the oven so that energy is uniformly distributed throughout the food mass.

For the preparation of foodstuffs having both large and small areas or volumes, it is desirable to allow for simultaneous heating of each food mass without excessive heating of the smaller masses or insufficient heating of the larger masses. Similarly, it is desirable to provide for simultaneous heating of very cold or frozen food masses along with warmer food masses, the temperatures of which are at ambient or room temperature, without excessive heating of the latter or insufficient heating of the former. Such simultaneous heating allows these masses of food to be ready for use at the same time. It is also desirable to obtain a uniform distribution of energy throughout the masses of material to be cooked.

This invention discloses a microwave oven with multiple cavities in which food masses of different sizes or different temperature characteristics can be placed. Multiple wave guides are used to supply microwave energy from a single source to each cavity so that simultaneous heating of such food masses results. This invention also discloses a microwave oven having a single cavity with multiple feeds that divides or distributes the microwave energy above and below a single large food mass for optimum thermal distribution. A mode-shifting device located at a common junction point of the multiple feeds is also used to provide a uniform distribution of microwave energy for uniform heating of the food masses. Further disclosures of this invention will become evident as it is described in this specification with reference to the accompanying drawing wherein:

Fig. 1 shows a vertical cross-section view of a high-frequency oven that is an embodiment of this invention;

Fig. 2 shows an embodiment of the mode-stirring device used to distribute energy within the oven;

Fig. 3 shows another embodiment of the mode-stirring device used to distribute energy within the oven; and Fig. 4 shows a vertical cross-section of a high frequency oven that is a further embodiment of this invention.

Referring to Fig. 1, there is shown an oven 1 constructed of a suitable metal having relatively thin walls formed in the shape of a container. The interior of oven 1 is divided into two compartments or cavities that are separated by a metal reflecting plate 2. A dielectric material 3 within the upper cavity 5 serves as a mounting platform for holding foodstuff 4 having a large mass. The lower cavity 6 is arranged so that foodstuff 7 having a small mass can be mounted at the bottom of oven 1 on a platform 8 made of dielectric material. A magnetron source 9 of high-frequency energy in the microwave region is mounted externally to the oven 1.

The microwave energy from magnetron 9 is inserted into waveguide 10 so as to excite a wave of electromagnetic energy in wave guide section 10. The dominant mode of transmission is the $TE_{10}$ mode. Thus, in the rectangular wave guide 10, the field of electric energy is perpendicular to the long dimension of the wave guide cross section. For the $TE_{10}$ mode, there is a half-wave variation in electric field intensity along the long dimension of the wave guide cross section and no variation in field intensity along the short dimension. This wave is propagated along wave guide section 10 in a direction toward the common junction point of wave guide section 14 and wave guide section 15, both of which are attached to and feed into oven 1. At the junction point, reflections occur off the walls of both the oven and wave guide sections that surround the junction point so that a small portion of the original wave propagates along wave guide section 15 in the direction of opening 17 near the bottom of the oven. The larger portions of the energy of the original wave propagates along wave guide section 14 in the direction of opening 16 at the top of the oven. If the reflecting surfaces 18 and 19 are positioned at the correct angles, all of the energy that propagates down wave guides 14 and 15 enters the oven cavities 5 and 6 by way of openings 16 and 17 and is used to heat the foodstuffs present in each cavity.

Within each cavity a particular mode of energy distribution is set up so that the foodstuff present is cooked by the penetration of this energy into the food mass in a well-known manner. If foodstuff 4 in cavity 5 has a larger volume that foodstuff 7 in cavity 6, the amount of energy required to heat foodstuff 4 within a particular period of time is greater than that required to heat foodstuff 7 within the same period of time. Because the larger portion of the original energy supplied by source 9 enters cavity 5 than enters cavity 6, the heating times of foodstuffs 4 and 7 will tend to be more nearly equal. Because there is a metal reflecting plate 2 separating the cavities, there is no exchange of energy between the cavities.

In addition to making the cooking time of the two food masses more nearly equal, it is also desirable to bring about a uniform distribution of energy, so that cooking will be uniform throughout the mass of each foodstuff. The wave guide configuration that feeds oven 1, therefore, is provided with a mode-stirring device, so that modes of operation within each cavity can be changed periodically to assure a more uniform energy distribution. A particular embodiment of one type of mode-stirring device is shown in Fig. 2. This device, which is placed at the junction of wave guide sections 10, 14, and 15, is comprised of a metal plate 12 attached to a shaft 13 driven by a suitable source which causes said shaft to rotate in the direction shown by the arrow.

The stirrer is approximately centered at the junction point. The length 20 of metal plate 12 is slightly less than the long dimension of the wave guide cross sections and the total height 21 of the plate is approximately twice the short dimension of the wave guide cross section. These dimensions allow for small clearances between the plate 12 and the walls of the wave guide at the junction point.

As shaft 13 rotates, the positions of the reflecting surfaces of metal plate 12 changes with respect to the incoming wave of high-frequency energy. The incoming wave strikes these rotating surfaces and is distributed between wave guides 14 and 15. The lengths of paths taken by the portions of the incoming wave distributed between wave guides 14 and 15 are continuously changing. The changes in path length cause a continuous change in the mode of operation within each of the oven cavities and, hence, cause a more uniform distribution of energy within each cavity. The stirrer shown in Fig. 2 causes an almost complete reflection of energy when it is in an approximately vertical position parallel to the sides of the oven as shown in Fig. 2. Thus, in that position, no substantial energy is able to propagate down either wave guide section 14 or 15. To counteract such a condition the stirring device can be modified in the manner shown in Fig. 3.

In Fig. 3, a rectangular slot 23 is shown cut in one area of metal plate 12. The slot is substantially centered between the shaft and one end of the plate. The long dimension of the slot is parallel to the long dimension of waveguide 10. The dimensions of the slot are determined by the wave guide dimensions and the wave length of the microwave energy being propagated down the guide. The slot exhibits the properties of a resonant transmitting iris so that, when the plate is located in a vertical position corresponding to that shown in Fig. 2, substantially all of the energy is transmitted through the slotted area of the metal plate and into wave guide section 14. Because $TE_{10}$ is being transmitted, substantially none of the energy exists along the wave guide boundaries; hence, essentially all of the energy is transmitted through the portion of the stirrer plate 12 that contains slot 23 and substantially none of the energy is transmitted through the portion of the stirrer plate 12 that contains no slot.

As the stirrer is rotated in the direction of the arrow, all of the energy is transmitted down either wave guide 14 or 15, and the ratio of energy transmitted down wave guide 14 to that transmitted down wave guide 15 is continually changing as the positions of the reflecting surfaces of plate 12 change with respect to the incoming wave of energy. Thus, essentially all of the energy from the source is transmitted to the oven cavities and an effective stirring action that changes the mode patterns within each cavity in a periodic manner is obtained. The overall energy distribution remains such that the larger portion of the incoming energy is still propagated down wave guide 14 into the upper cavity.

Fig. 4 discloses another embodiment of this invention. In this figure the oven configuration and wave guide feeds are similar to that shown in Fig. 1 except that the oven is no longer divided into two separated cavities. Instead the oven is partially separated by a dielectric platform 24 which is large enough so that a large mass of foodstuff 4 may be mounted thereon. A mode-stirring device 12, as described in Figs. 2 and 3, is located at the junction of wave guide sections 10, 14, and 15.

The propagation of incoming microwave energy from source 9 down wave guide sections 10, 14, and 15 is substantially the same as that described with relation to Figs. 2 and 3 above. For the oven configuration shown in Fig. 4, the microwave energy enters through openings 16 and 17. Because the foodstuff is located between these openings, the energy strikes the foodstuff at points above and below the food mass. Because substantially all of the food's surface area is exposed to some directly incident and reflected microwave energy, the thermal distribution of energy is more efficient and cooking is more thorough than in ovens containing only a single opening, or in ovens in which food can be mounted with only a portion of its surface area exposed to microwave energy.

For an oven configuration as shown in Fig. 4 there is a possibility that a cross-flow of reflected energy between the two microwave feeds will occur and, hence, a decrease in effective energy for heating will result. To partially prevent this exchange of power the wave guide sections 14 and 15 are arranged so that the direction of the field of electric energy at opening 16 is different from that at opening 17. At opening 16, the vectors representing the electric field are aligned substantially parallel to the top of the oven and perpendicular to the longer dimension of the opening. At opening 17, the vectors representing the electric field are aligned substantially parallel to the sides of the oven and perpendicular to the longer dimension of the opening and, thus, oriented approximately 90° from those at opening 16. This difference in polarizations of the electric fields at each opening helps to prevent a cross-flow of reflected energy between the microwave energy feeds 14 and 15.

It is not to be assumed that the oven configurations shown in Fig. 1 and Fig. 4 and the stirrer configurations shown in Figs. 2 and 3 are the only embodiments of this invention. For instance, the oven can be used to heat materials other than masses of foodstuffs. The masses of materials to be heated may be materials having different temperature characteristics. For example, one may be at room temperature or higher and the other may be at a cool or freezing temperature. More than two feeds may be used to supply the oven at more than two points with microwave energy from one or more high-frequency energy sources. More than two chambers may be used within the oven and these chambers may be supplied with high-frequency energy from separate, multiple feeds. Other types of mode stirring may be used to bring about uniformity of energy distribution and sources of high-frequency energy other than magnetrons may also be used. Those skilled in the art may undoubtedly conceive modifications in the particular configuration described in this specification, all within the scope of this invention. Accordingly, it is desired that the invention not be limited by the details of the particular embodiments described herein, except as defined by the appended claims.

What is claimed is:

1. In combination, an electronic oven including means for mounting materials to be heated, source means external to said oven for generating electromagnetic wave energy, connecting means for feeding said electromagnetic wave energy to intermediate means for separating said electromagnetic wave energy into a plurality of substantially unequal portions, means adapted to be mounted within said intermediate means for continuously varying the modes of oscillation of said unequal portions, multiple means connected to said intermediate means for feeding each of said plurality of substantially unequal portions separately from said intermediate means directly to said oven.

2. In combination, an electronic oven including a plurality of separate chambers and means for mounting material to be heated in each of said chambers, source means external to said oven for generating electromagnetic wave energy, connecting means for feeding said electromagnetic wave energy to intermediate means for separating said electromagnetic wave energy into a plurality of substantially unequal portions, means adapted to be mounted within said intermediate means for continuously varying the modes of oscillation of said unequal portions, multiple means for feeding said plurality of substantially unequal portions separately from said intermediate means directly to each of said plurality of separate chambers.

3. In combination, an electronic oven including first and second separate chambers and means for mounting a large mass of material to be heated in said first chamber and means for mounting a small mass of material to be heated in said second chamber, source means external to said oven for generating electromagnetic wave energy, connecting means for feeding said electromagnetic wave energy to intermediate means for separating said electromagnetic wave energy into two substantially unequal portions, means adapted to be mounted within said intermediate means for continuously varying the modes of oscillation of said unequal portions, dual means for feeding said two substantially unequal portions separately from said intermediate means directly to each of said first and second chambers.

4. In combination, an electronic oven including a plurality of separate chambers and means for mounting material to be heated in each of said chambers, source means external to said oven for generating electromagnetic wave energy, connecting means for feeding said electromagnetic wave energy to a single, movable means for separating said electromagnetic wave energy into a plurality of substantially unequal portions, means adapted to be mounted within said intermediate means for continuously varying the modes of oscillation of said unequal portions, multiple means for feeding said plurality of substantially unequal portions separately from said single, movable means directly to each of said plurality of separate chambers.

5. In combination, an electronic oven including a plurality of separate chambers and means for mounting material to be heated in each of said chambers, source means external to said oven for generating electromagnetic wave energy, connecting means for feeding said electromagnetic wave energy to a single, movable means comprised of a plate wherein is located a rectangular opening, said single, movable means for separating said electromagnetic wave energy into a plurality of substantially unequal portions, means adapted to be mounted within said intermediate means for continuously varying the modes of oscillation of said unequal portions, multiple means for feeding said plurality of substantially unequal portions separately from said single, movable means directly to each of said plurality of separate chambers.

6. In combination, an electronic oven including a chamber partially separated by a dielectric platform, said platform for mounting material to be heated, source means external to said oven for generating electromagnetic wave energy, connecting means for feeding said electromagnetic wave energy to intermediate means for separating said electromagnetic wave energy into two substantially unequal portions, means adapted to be mounted within said intermediate means for continuously varying the modes of oscillation of said unequal portions, dual means for feeding said two substantially unequal portions from said intermediate means directly to said oven at points above and below said platform.

7. In combination, an electronic oven including a chamber partially separated by a dielectric platform, said platform for mounting material to be heated, source means external to said oven for generating electromagnetic wave energy, connecting means for feeding said electromagnetic wave energy to intermediate means for separating said electromagnetic wave energy into two substantially unequal portions, means adapted to be mounted within said intermediate means for continuously varying the modes of oscillation of said unequal portions, dual means for feeding said two substantially unequal portions from said intermediate means directly to said oven at points above and below said platform, said two substantially unequal portions entering said oven with different types of polarization.

8. In combination, an electronic oven including a plurality of separate chambers and means for mounting material to be heated in each of said chambers, source means external to said oven for generating electromagnetic energy, connecting means for feeding said electromagnetic wave energy to a junction point, multiple means for feeding a plurality of substantially unequal portions of said electromagnetic wave energy from said junction point to each of said plurality of separate chambers.

9. In combination, an electronic oven including a chamber partially separated by a dielectric platform, said platform for mounting material to be heated, source means external to said oven for generating electromagnetic wave energy, connecting means for feeding said electromagnetic wave energy to a junction point, multiple means for feeding a plurality of substantially unequal portions of said electromagnetic wave energy from said junction point to said oven at points above and below said dielectric platform.

10. A method of heating materials which consists in placing a large mass of material within a first chamber of an electronic oven and placing a small mass of material within a second chamber of an electronic oven, generating a source of electromagnetic wave energy, separating said electromagnetic wave energy into two predetermined substantially unequal portions each portion having continuously varying modes of oscillation, and feeding said two substantially unequal portions separately to each of said first and second chambers.

11. A method of heating materials which consists in placing a mass of material having a low body temperature within a first chamber of an electronic oven and placing within a second chamber of said oven a mass of material having a substantially higher initial body temperature than said mass of material in said first chamber, generating a source of electromagnetic wave energy, separating said electromagnetic wave energy into two predetermined substantially unequal portions, each portion having continuously varying modes of oscillations, and feeding said two substantially unequal portions separately to each of said first and second chambers.

References Cited in the file of this patent

UNITED STATES PATENTS

| | | |
|---|---|---|
| 2,544,715 | Muchmore | Mar. 13, 1951 |
| 2,716,694 | Schroeder | Aug. 30, 1955 |
| 2,757,341 | Lundstrom | July 31, 1956 |
| 2,790,054 | Haagensen | Apr. 23, 1957 |